Dec. 20, 1955  K. RENTSCHLER  2,727,445
CAMERA SHUTTER WITH COMPACT DELAYING AND FLASH FIRING MEANS
Filed June 7, 1951  3 Sheets-Sheet 1

INVENTOR
KARL RENTSCHLER
BY Robert K. Jacob
AGENT

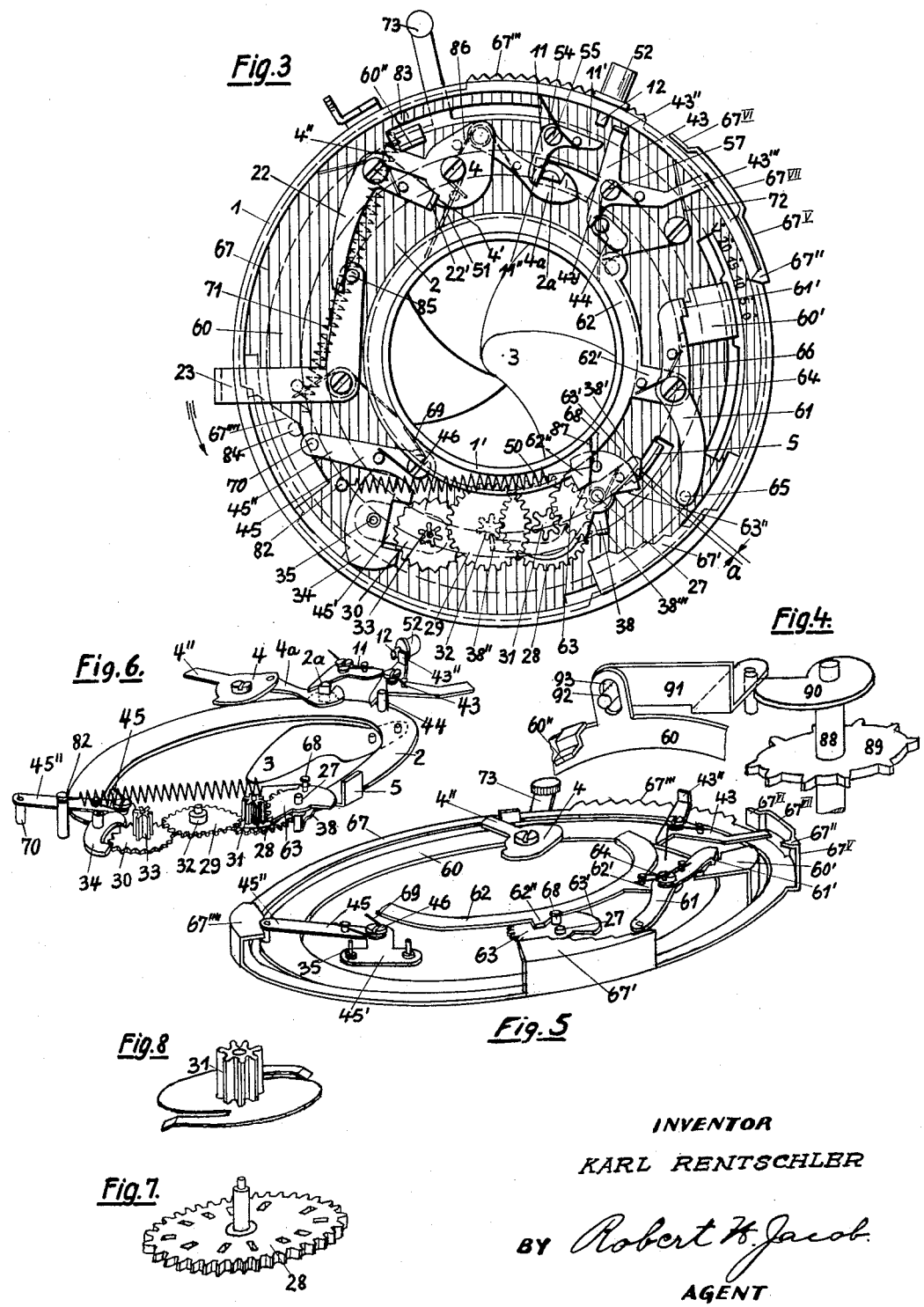

Dec. 20, 1955 K. RENTSCHLER 2,727,445
CAMERA SHUTTER WITH COMPACT DELAYING AND FLASH FIRING MEANS
Filed June 7, 1951 3 Sheets-Sheet 3
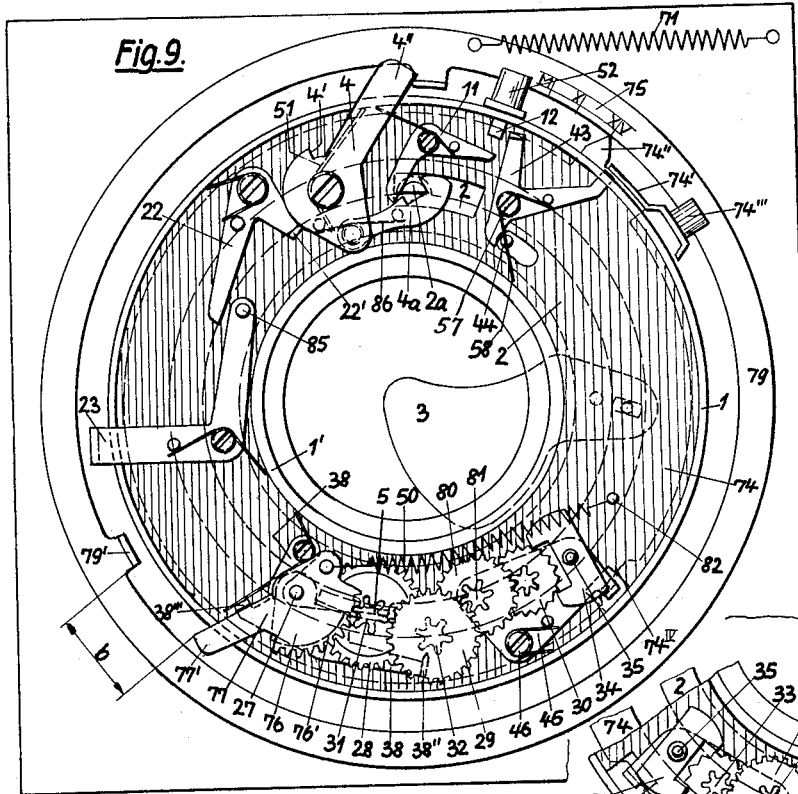
Fig. 9.
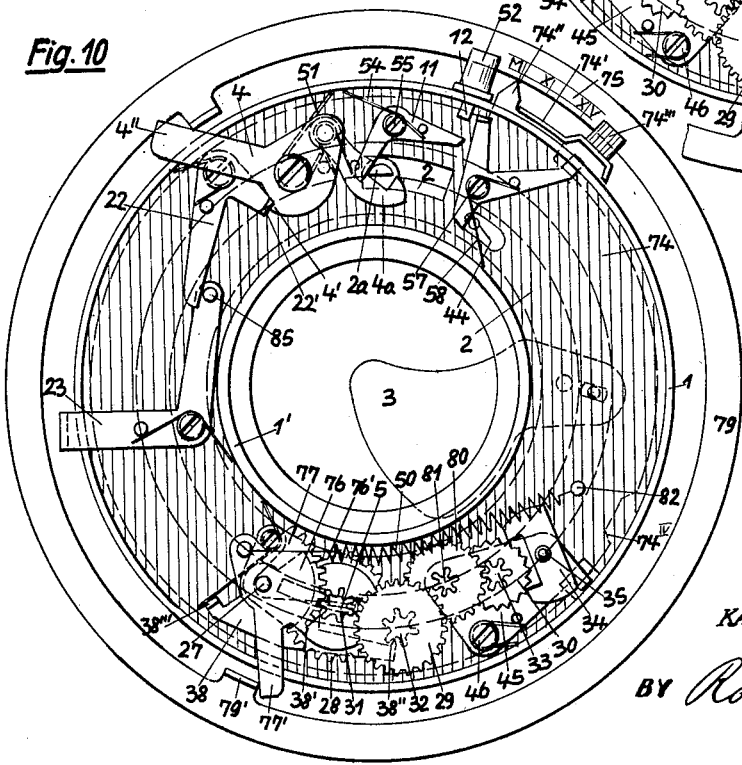
Fig. 10.
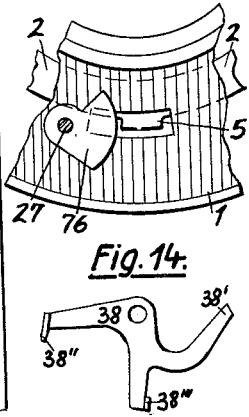
Fig. 12.
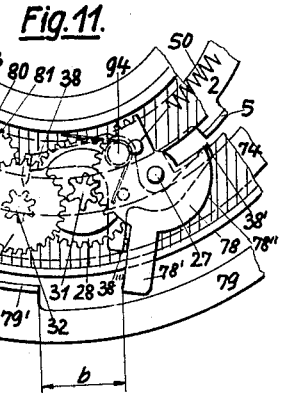
Fig. 14.
Fig. 11.
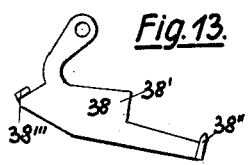
Fig. 13.
INVENTOR
KARL RENTSCHLER
BY Robert H. Jacob
AGENT

United States Patent Office 2,727,445
Patented Dec. 20, 1955

2,727,445

CAMERA SHUTTER WITH COMPACT DELAYING AND FLASH FIRING MEANS

Karl Rentschler, Calmbach (Enz), Germany, assignor to Alfred Gauthier G. m. b. H., Calmbach (Enz), Germany Application June 7, 1951, Serial No. 230,279

Claims priority, application Germany June 13, 1950

10 Claims. (Cl. 95—11.5)

The present invention relates to a novel photographic intra-lens shutter with a contactor for firing photoflash lamps, and with a retarding mechanism for flashlight synchronization, by means of which the opening of the shutter is delayed with respect to the completion of the flashlight circuit, to correspond to the flashing lag of the lamp used.

The invention deals with the problem of creating a shutter mechanism in which cocking the shutter simultaneously cocks the retarding mechanism for flashlight synchronization.

The objects of the invention are different solutions of this problem, in particular for the case where the photographic shutter has a delaying mechanism for self exposures and where a part of this delaying mechanism is utilized as a retarding mechanism for purposes of flashlight synchronization.

Another object of the invention is to obtain the delaying periods required for the various flash lamps by providing the retarding mechanism with potential energies of different values in cocking the shutter.

Another object of the invention is a photographic intralens shutter having a built-in delaying mechanism for self-exposures, in which a part of this delaying mechanism is used as a retarding mechanism for flashlight synchronization, in which connection a particularly simple form of construction of this shutter is achieved in that for flashlight synchronization only two settings are provided for those flash lamps most commonly used, i. e. units which achieve their maximum brilliancy after about 20 milliseconds, and for others which operate without flashing lag.

The manner in which these objects are realized is explained hereinafter with reference to the accompanying drawings in which:

Fig. 3 shows the same shutter in the same representation as Fig. 1, but in a cocked position, while the shutter has been set for lamps with a flashing lag (10 msec.);

Fig. 4 shows the linking of the film feed with the cocking action of the shutter;

Fig. 5 shows in a perspective view the interaction of a few important setting and cocking components;

Fig. 6 shows, also in the perspective, the interaction of the shutter blade ring with the contactor members serving to complete the flashlight circuit, as well as with the retarding mechanism;

Fig. 7 shows a gear wheel important for the cocking of the retarding mechanism;

Fig. 8 shows a coupling member co-operating with the gear wheel of Fig. 7;

Fig. 9 shows in a top view a further embodiment of the invention where the shutter is set for work with the delaying mechanism for self exposures;

Fig. 10 shows, also in a top view, the same shutter as Fig. 9 but in a cocked position, set for flashlight exposure by using a part of the delaying mechanism for flash lamp synchronization;

Fig. 11 shows a different embodiment of a part of the shutter in accordance with Figs. 9 and 10;

Figs. 12 to 14 show details of the foregoing figures for a better understanding of the invention.

Figure 1:
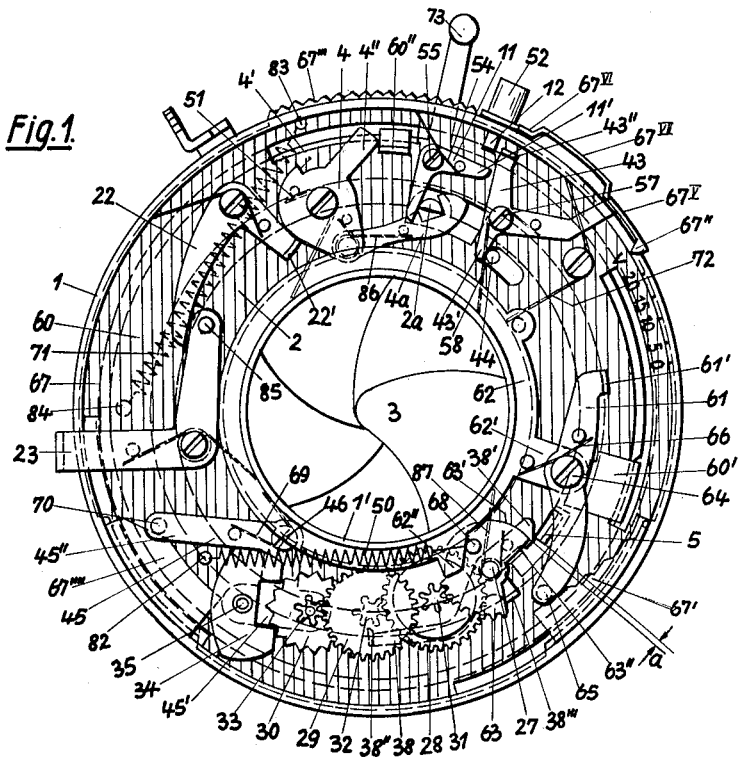
Fig. 1 is a top view of an overall representation of the interaction of those components of the shutter covered by this invention as are important for the operation, and this in their idle positions, while the setting ring is set for "V," which means the shutter is adapted for self-exposures.
Figure 2:
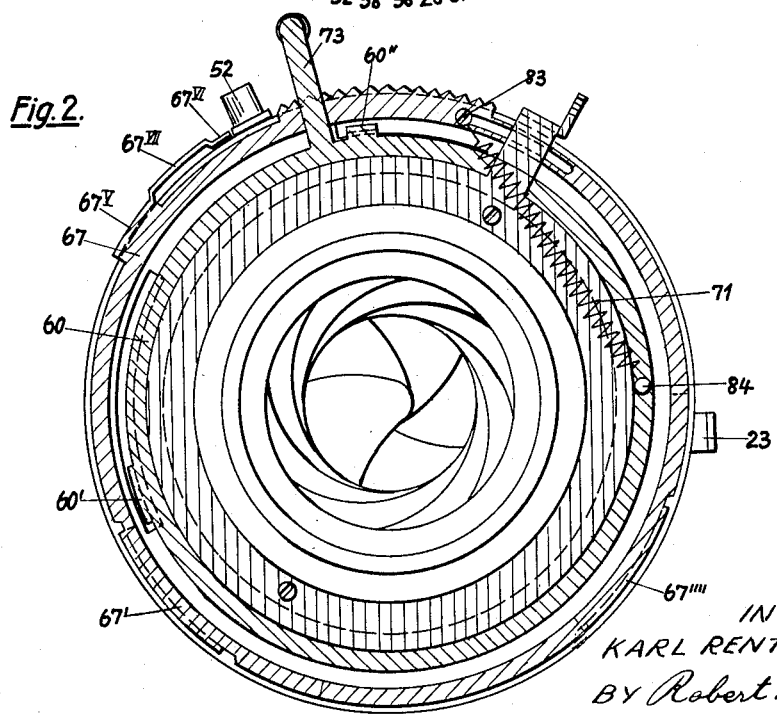
Fig. 2 shows the same shutter in the same position as in Fig. 1, but in a rear view to illustrate the setting and cocking members at the rear of the shutter.

Fig. 1 illustrates the shutter housing 1 in which the ring 2 is arranged which actuates the shutter blades 3, and which is moved back and forth by the cocking lever 4 of the shutter by way of an intermediate pusher pawl 4a engaging the blade ring pin 2a. This cocking lever 4 is tripped by means of the lever 23 from the cocked position in which it is held by pawl 22. Fig. 1 shows furthermore that the blade or sector ring 2 carries a lug 5.

It is an essential feature of the invention that a mechanism is provided whereby the cocking of the delaying mechanism for self-exposures, or of the retarding mechanism for flash lamp synchronization which forms part of this delaying mechanism is effected simultaneously with the setting of the shutter.

This mechanism comprises the cocking ring 60 which in accordance with the invention carries an extra arm 60'. This arm 60' transfers the movement of the cocking ring 60 by way of an adjustable lever 61 and a ring 62 to the delaying mechanism.

In the present case, this delaying mechanism includes the pivot 27 on which a segment 63 is rotatably arranged, the wheel plates (not shown) as well as the gears 28 and 29, the balance wheel 30 and the pinions 31, 32, 33, the anchor 34 with its shaft 35 and the spring 50, which is attached at one end to pin 68 on the segment 63, and at the other end to the pin 82 which is secured to the housing. When this delaying mechanism is used as a retarding mechanism in flash lamp synchronization, the balance wheel 30 with pinion 33, and the anchor 34 with its shaft 35 are disengaged. The retarding mechanism proper for flashlight synchronization, thus comprises the parts 63, 31, 28, 32, 29, 50, and 82.

It is important that in the embodiment shown the path of travel of the cocking ring 60 or of arm 60' for cocking the shutter or the delaying mechanism is always of equal length and corresponds to the angular position which is assumed by the nose 60" of ring 60 in Fig. 1 with respect to that in Fig. 3. Notwithstanding this predetermined path of travel the invention provides for different delay periods corresponding to those indicated on the dials of Figs. 1 and 3 as 0, 5, 10, 15, or 20 milliseconds or any intermediate values by the following setting mechanism:

For supporting the adjustable lever 61, the ring 62 which carries the extension 62' to receive the pin 64 of the adjustable lever 61 is rotatably mounted around the tubular inner wall 1' of the housing 1. As is apparent from the figures, lever 61 is double armed. At its one extremity it terminates in a rectangularly extending lug 61', while at its other end it has a control pin 65, the engaging face of which rests under the pressure of spring 66 against one of the steps of the stepped cam 67' of the setting ring 67, which is pivotally mounted on the rear wall of the housing, and the pointer nose 67" of which can be set by means of the knurled edge 67''' to any of the retardation periods which are associated with the different types of flash lamps to be used.

By this adjustment for the flashing lag of the flash lamp employed, the adjustable lever 61 is given such an angular position, that the bent-over lug 61' cooperates with the associated step of the abutments at the end of arm 60' of the cocking ring 60. It can be seen that the number of steps of the cam arm 67' of the ring 67 corresponds to the abutments, at the end of the arm 60' of the cocking ring 60.

It is furthermore apparent from the drawing, that as soon as the lug 61' engages a step of the cam arm 60' when the cocking ring 60 is being rotated, the latter carries along the setting lever 61 during its further rotation and with it the bearing ring 62 with its nose 62" whereby the pin 68 which is attached to segment 63 and is under the tension of spring 50 is angularly displaced by the nose 62" to an extent which corresponds to the adjusted flashing lag of the particular lamp employed.

The position shown in Fig. 1 corresponds to the adjustment for work with the delaying mechanism for self exposures for which case the mark on the dial is designated by "V." As can be seen, in this position the guide pin 65 of the adjusting lever 61 rests on the uppermost step of the stepped cam 67'. In this case, lug 61' of lever 61 turned clockwise to the maximum extent strikes the lowest step of the stepped cam arm 60' of the cocking ring 60. This position provides also for maximum running time of the segment 63. Moreover, in this position the disengageable elements 30, 33, 34, and 35, are engaged which results in the running time of segment 63 being about 10 sec.

As already mentioned above, a part of the delaying mechanism provided for self exposures in the embodiment illustrated by the drawings is intended to act as a retarding mechanism in flash lamp synchronization. Arrangements are therefore, made that with the setting of the adjusting ring 67 to any of the numbers between "20" and "0," the elements 30, 33, 34, and 35 are automatically disengaged. To this end, the adjusting ring 67 is provided with a cam 67'''', which is engaged by pin 70 under the pressure of spring 69. Pin 70 is mounted on an arm 45" of a two armed lever 45 pivoted on a shaft 46, the other arm 45' of which is formed as a disengageable bridge which carries the elements 30, 33, 34, and 35 which are brought out of engagement whenever the adjusting ring is advanced from the index mark "V" to any of the numbers "0" to "20."

As shown, the dial carries a setting mark "0." Adjustment thereto does not only mean that the shutter is in condition to operate with an instantaneous flash lamp, but also that the mechanical coupling between the cocking ring 60 and the ring 62 is disengaged, and that therefore the delaying mechanism is not set along with the setting of the shutter by means of the cocking ring 60.

To complete the flashlight circuit, two contact levers 11 and 43 are provided which are controlled by the pins 2a and 44 mounted on the sector ring. Both contact levers engage the same mating contact 12. It should be observed in this connection that the contact lever 11 strikes the mating contact 12 only when the shutter blades are nearly fully open, while the contact lever 43 contacts its mate 12 already after the sector ring 2 has traveled through a very small angular displacement, and this contact takes place while the shutter blades still overlap each other. The time sequence of contact closure by the two contact levers 11 and 43 is accomplished by the feature of the arm 11' of the contact lever 11 which faces the mating contact 12 being a greater distance from the latter than the nose 43" of the contact lever 43, as well as by the selection of the relative lengths of the two lever arms 43' and 43" of the contact lever 43, and of the length of the arms 11' and 11" of the contact lever 11.

Upon setting adjusting ring 67 to the marks "0" and "V," by turning the knurled edge 67''' contact closure by the contact lever 43 is not possible. The setting ring 67 has a bentup arm (67$^V$, 67$^{VI}$, 67$^{VII}$) which upon setting to the two aforesaid marks covers either with the part 67$^V$ or with the part 67$^{VI}$ a slot in the wall of the housing through which projects the arm 43''' of the lever 43. Therefore an adjustment to the marks "0" and "V," permits closing of the circuit only by means of the contact lever 11 at the moment indicated hereinabove.

With the shutter set to marks other than "0" and "V" (Fig. 3), it is always the contact lever 43 which determines the completion of the flashlight circuit. In these positions, the portion 67$^{VII}$ of the bent-up arm (67$^V$, 67$^{VI}$, 67$^{VII}$) of the ring 67 is near the slot provided in the wall of the housing for the swinging movement of the arm 43'''. This portion 67$^{VII}$ is more remote from the wall of the housing than the portions 67$^V$ and 67$^{VI}$, and will not prevent the arm 43''' from swinging. As soon as the sector ring 2 has traveled through the small angular path $a$ (Figs. 1 and 3), the arm 43' of the contact lever 43 is released by the pin 44, thus enabling the contact lever 43 under the pressure of spring 58 to close the contact while the shutter blades still overlap at the end of this angular path.

For explaining the time sequence of the shutter movements, a brief explanation of the steps is given hereinafter of the example illustrated in Fig. 3 in conjunction with the Figs. 5 and 6.

In Fig. 3, the simultaneous cocking of shutter and retarding mechanism has been completed. The nose 60" of the cocking ring 60 still rests on arm 4" of the shutter cocking lever 4. Under the pressure of spring 71 held at one end by pin 83 attached to the casing while its other end is fixed to pin 84 on the cocking ring, ring 60 now returns to its normal position of Fig. 1. When the shutter release lever 23 is now operated by moving it in the direction of the arrow, the lever 22 is rotated clockwise by means of the pin 85 on the other arm of the shutter release lever. At the same time the bent-up lug 22' of the lever 22 slides off nose 4' of the cocking lever 4 and releases it for unwinding. The cocking lever 4 starts to rotate clockwise under the pressure of spring 51 while under the pressure of a spring 86, pawl 4a, pivoted on cocking lever 4 and resting against pin 2a of the sector ring 2 starts to rotate the sector ring.

By this rotation of the sector ring 2, the contact levers 11 and 43, bearing on the pins 2a and 44, and pivoted on the casing in 55 and 57, are also caused to rotate counterclockwise under the pressure of the springs 54 and 58. After a small angular displacement $a$, the nose 5 of the shutter blade ring 2 hits the smooth edge 63' of the segment gear 63 which stops the movement of the shutter blade ring. This short angular movement $a$ suffices to permit the contact lever 43 resting against pin 44 on the sector ring to effect such a rotary movement under the pressure of spring 58, that the bent-up nose 43" engages the mating contact 12 to close the flashlight circuit. In traveling through the angular displacement $a$, the shutter blades 3 were also set in motion, but at the end of the travel $a$, their overlap is still intact. In the time interval between release and engagement of nose 5 with smooth edge 63' of the segment gear 63, also the delay mechanism is tripped in that nose 5 by engaging an arm 38' of a lever 38 swings this lever 38 counterclockwise and against the pressure of spring 87, so that the other arm 38" of this lever 38 disengages the pinion 32, thereby releasing the retarding mechanism for operation. As a result, the segment gear 63 now starts to rotate counterclockwise under the pressure of spring 50, while the sector ring 2 with its nose 5 bearing on the smooth edge 63' of the segment gear 63 is detained until the cam section 63' has moved past the lug 5. At this instant, lug 5 is released to move along edge 63" of the segment gear 63, so that the sector ring can effect the opening and closing of its shutter blades in a manner known per se.

As a result of adjustment to the mark "10," the cam 67'''' assumes such a position, that lever 45 is swung aside far enough that pinion 33 and thus also the other parts 30, 34, 35 carried by the lever 45 are disengaged from the rest of the delay mechanism. In making the adjustment to the mark "10," the ring 62, in being cocked by the cocking ring 60, was carried along by means of the two-armed lever 61 by the stepped cam 60' on ring 60 over such a distance, that spring 50 was given such an amount of potential energy and the smooth cam section 63' of the segment gear 63 was turned so far in the path of lug 5 of the sector ring 2, that the time between the release of the cocking lever 4 and the full opening of the shutter blades amounts to 10 milliseconds.

In keeping with the tendency towards mechanization of the operation of shutters and photographic cameras, Fig. 4 illustrates an example, how the rotary travel of the cocking ring 60, as required for cocking, is made dependent on the means for feeding the film. A full revolution of the film feeding roll 89 mounted on shaft 88 is required to bring into focus the section of film for the next exposure. Simultaneously the eccentric disc 90, firmly attached to the shaft 88, goes through a full revolution. An intermediate member 91, transfers this motion of the eccentric disc 90 to the cocking ring 60 by way of a slot-and-pin control mechanism 92, 93.

Figs. 7 and 8 together with Figs. 1, 3, and 6 serve to explain the cocking of the delaying or retarding mechanism. To allow the retarding mechanism to be cocked in a simple manner a friction clutch 28, 31 is provided, so that in cocking only the parts 63, 31 of the retarding mechanism are moved, while the other parts are detained by the arm 38" of lever 38 engaging the pinion 32 under the pressure of spring 87.

The further embodiment illustrated by Figs. 9 and 10 meets the practical requirements arising out of the fact that most flash lamps reach maximum brilliancy some 20 milliseconds after they have been fired. Consequently, the shutter shown in the Figs. 9 and 10 has only one position for the retarding mechanism which controls the flash light synchronization, i. e. the position defined by the mark "M" which corresponds to the flashing lag of the aforesaid lamps. In this manner it is possible to use a minimum of structural components in assembling the shutter.

More in particular, adjusting ring 67 of the Figs. 1, 2, 3 and 5 is here replaced by ring 74. This ring 74 has the bent-up arm 74' which blocks the contact lever 43 when the pointer 74" is set to the marks "X" and "X/V," while it permits contact closure when adjusted to the mark "M." As can be seen from Figs. 9 and 10, the ring 74 can be set by means of the knob 74'''. These figures also show the control cam 74'''' carried by the ring 74. Setting this ring 74 to the mark "X/V" brings into engagement the disengageable parts 80, 81, 30, 33, 34, 35 of the delaying mechanism, with the remaining parts 27, 76, 77, 28, 29, 31, 32, 38, 50, and 84 of the mechanism, while setting it to the marks "X" and "M" it disengages these disengageable parts 80, 81, 30, 33, 34, 35. It is furthermore important in this connection that the delaying mechanism 80, 81, 30, 33, 34, 35, 27, 76, 77, 28, 29, 31, 32, 38, 50, and 84 is so constructed that the direction of rotation in cocking this delay mechanism is the same as in cocking the shutter. For this purpose provisions have been made in that an arm 77' is arranged on the toothed segment gear 77 which is supported on shaft 27 which arm co-operates with arm 79' of the cocking ring 79. Furthermore, as shown in detail by Fig. 12, a disc 76 is disposed in the base section of the retarding mechanism which is secured to the shaft 27. The circumference of this disc 76 is formed as a concentric arc section 76', which as shown by Figs. 9, 10, and 12 cooperates with the bent-up lug 5 of the sector ring 2. For a better understanding of the Figs. 9 and 10, Fig. 13 shows a detail view of lever 38.

Fig. 11 shows how the same direction of rotation for cocking the shutter and the retarding mechanism can be obtained in a different manner. Here, the segment wheel 78 is provided with an arm 78', which cooperates with the arm 79' of the cocking ring 79, and which carries a concentric arc section 78" which cooperates with the bent-up lug 5 of the sector ring 2. In Fig. 14, the lever 38 which pivots around the shaft 94 secured to the housing is shown separately for a better understanding of Fig. 11.

The task of the arc section 76' as well as of the arc section 78" is exactly the same as that of the arc section 63''' of the segment wheel 63 in accordance with Figs. 1, 3, 5, and 6.

The cocking ring 79 can be supported in the shutter housing 1 in the same manner as the cocking ring 60 (Figs. 1, 2, 3, 4, and 5); however it is also possible to support it concentric with the shutter outside the housing, as illustrated by Figs. 9, 10, and 11.

As a rule, the path of travel required for cocking lever 4 in cocking the shutter will differ from the path travelled by segments 77 or 78 in cocking the retardation mechanism. This difference can be compensated for by an idle path denoted by b in Figs. 9 and 11. Here the cocking course of the lever 4 exceeds that of the segments 77 or 78.

From the aforesaid statements it is evident that with the embodiments of the Figs. 9 to 14 the entire delaying mechanism 80, 81, 30, 33, 34, 35, 27, 76, 77, 28, 29, 31, 32, 38, 50, and 84, or only the portion 27, 76, 77, 22, 29, 31, 32, 28, 50, and 84, which serves for flash light synchronization, unwinds for each exposure prior to the opening move of the shutter blades.

A mechanism linking the setting of the retarding mechanism for flashlight synchronization with the cocking of the shutter is known from American Patent No. 2,404,526 to Pirwitz. However, Pirwitz does not effect this in a way that by cocking the spring forming the power source for the retarding mechanism the latter receives potential energy of different magnitude corresponding to the delay periods required for the various flash lamps. In the embodiment of the Figs. 1 to 6, this is effected in that the spring 50 depending on the setting of the pointer 67" to any of the marks "0," "5," "10," "15," "20," "V," is given different mechanical tensions by way of the two-armed lever 61, or the stepped cam 67' of the setting ring 67, with which pin 65 of lever 61 cooperates. Further, in the aforementioned Pirwitz patent the retarding mechanism for flash light synchronization does not form part of the delaying mechanism used in self-exposures.

Having thus fully described my invention with reference to the embodiments illustrated and described, I do not wish to be limited to the particular embodiments disclosed, but what I claim as my invention is set forth in the appended claims.

I claim:

1. A photographic camera shutter comprising a shutter and operating means therefor, a contact mechanism for firing flash bulbs, a retarding mechanism including a driving spring and synchronizing means adapted to synchronize the firing of different flash bulbs by said contact mechanism with the operation of the shutter, said synchronizing means comprising the combination of shutter operating means adapted to be blocked in operative position by said retarding means and including a cocking lever, winding means for advancing said retarding mechanism to shutter blocking position, interconnecting means in operative relationship to said shutter operating means and said winding means for simultaneously cocking said shutter and winding said retarding mechanism, blocking means operatively connected with and adapted upon unwinding of said retarding mechanism to unblock said shutter operating means, and means operatively connected to said winding means adapted to impart to said driving spring of said retarding mechanism potential energy of predetermined magnitudes corresponding to different set positions of said blocking means and to different time delay periods.

2. A photographic camera shutter comprising a shutter and operating means therefor, a contact mechanism for firing flash bulbs, a retarding mechanism including a driving spring and synchronizing means adapted to synchronize the firing of different flash bulbs by said contact mechanism with the operation of the shutter, said synchronizing means comprising the combination of shutter operating means adapted to be blocked in operative position by said retarding means and including a cocking lever, concentric winding means including a setting ring for advancing said retarding mechanism to shutter blocking position, concentric interconnecting means in operative relationship to said shutter operating means and said concentric winding means for simultaneously cocking said shutter and winding said retarding mechanism, including a member pivotally supported by an arm on said setting ring and a connecting ring, blocking means operatively connected with and adapted upon unwinding of said retarding mechanism to unblock said shutter operating means, and means operatively connected to said winding means adapted to impart to said driving spring of said retarding mechanism potential energy of predetermined magnitudes corresponding to different set positions of said blocking means and to different time delay periods.

3. A photographic camera shutter comprising a shutter and operating means therefor, a contact mechanism for firing flash bulbs, a retarding mechanism including a driving spring and synchronizing means adapted to synchronize the firing of different flash bulbs by said contact mechanism with the operation of the shutter, said synchronizing means comprising the combination of shutter operating means adapted to be blocked in operative position by said retarding means and including a cocking lever, concentric winding means including a setting ring for advancing said retarding mechanism to shutter blocking position, a lug on said setting ring and a pin disposed upon a segment gear of said retarding mechanism adapted for engagement by said lug, concentric interconnecting means in operative relationship to said shutter operating means and said concentric winding means for simultaneously cocking said shutter and winding said retarding mechanism, including a member pivotally supported by an arm on said setting ring and a connecting ring, said pivotally supported member constituting a double armed lever and said connecting ring having a lug adapted to engage the cocking lever and a lug forming a stepped cam adapted to engage one arm of said double armed lever, blocking means operatively connected with and adapted upon unwinding of said retarding mechanism to unblock said shutter operating means, said blocking means including a disk having cam means, and adjusting means operatively connected to said winding means adapted to impart to said driving spring of said retarding mechanism potential energy of predetermined magnitudes corresponding to different set positions of said disk and to different delay periods, said adjusting means comprising a concentric adjusting ring having a stepped control cam with a step for each flash delay period including zero and being disposed adjacent said double armed lever and adapted to engage a guide pin on the other arm of said lever.

4. A photographic camera shutter comprising a shutter and operating means therefor, a contact mechanism for firing flash bulbs, a retarding mechanism including a driving spring and synchronizing means adapted to synchronize the firing of different flash bulbs with the operation of the shutter, said synchronizing means comprising the combination of shutter operating means adapted to be blocked in operative position by said retarding means and including a cocking lever, concentric winding means including a setting ring for advancing said retarding mechanism to shutter blocking position, a lug on said setting ring and a pin disposed upon a segment gear of said retarding mechanism adapted for engagement by said lug, concentric interconnecting means in operative relationship to said shutter operating means and said concentric winding means for simultaneously cocking said shutter and winding said retarding mechanism, including a member pivotally supported by an arm on said setting ring and a connecting ring, said pivotally supported member constituting a double armed lever and said connecting ring having a lug adapted to engage the cocking lever, a lug forming a stepped cam adapted to engage one arm of said double armed lever and an arm in engagement with the film advancing mechanism enabling movement of said ring by operating the film advancing mechanism, blocking means operatively connected with and adapted upon unwinding of said retarding mechanism to unblock said shutter operating means, said blocking means including a disk having cam means, and adjusting means operatively connected to said winding means adapted to impart to said driving spring of said retarding mechanism potential energy of predetermined magnitudes corresponding to different set positions of said disk and to different delay periods, said adjusting means comprising a concentric adjusting ring having a stepped control cam with a step for each flash delay period including zero and being disposed adjacent said double armed lever and adapted to engage a guide pin on the other arm of said lever.

5. A photographic camera shutter comprising a shutter in a housing and operating means including a sector ring, a contact mechanism for firing flash bulbs and a retarding mechanism including a driving spring and synchronizing means adapted to synchronize the firing of different flash bulbs with the operation of the shutter, said synchronizing means comprising the combination of shutter operating means adapted to be blocked in operative position by said retarding means and including a cocking lever, winding means for advancing said retarding mechanism to shutter blocking position, interconnecting means in operative relationship to said shutter operating means and said winding means for simultaneously cocking said shutter and winding said retarding mechanism, blocking means operatively connected with and adapted upon unwinding of said retarding mechanism to unblock said shutter operating means and including a blocking cam disk, means operatively connected to said winding means adapted to impart to said driving spring of said retarding mechanism potential energy of predetermined magnitudes corresponding to different set positions of said blocking cam disk corresponding to different time delay periods, said contact mechanism including two contact levers operatively connected to pins on said sector ring, one of said contact levers being adapted to close the circuit after the opening of the shutter, the other of said contact levers being adapted to close the circuit before opening of the shutter, a mating contact for said contact levers and an adjustable ring supported on the shutter housing having a turned-up arm provided with conformations adapted in one position of said ring to block said contact lever and in another position of said ring to release said lever for closing the circuit before the opening of the shutter.

6. In a photographic camera shutter comprising a shutter and operating means therefor, and a contact mechanism for firing flash bulbs, the combination of means including a shutter delaying mechanism having a driving spring, synchronizing means adapted to synchronize the operation of said shutter operating means with the operation of the contact mechanism in a manner to permit use of the greatest shutter speeds, said synchronizing means comprising a retarding mechanism constituted by a section of said delaying mechanism, means operative to disengage a section of said delaying mechanism and free the remaining section including said driving spring as an operating mechanism for said contact mechanism, shutter setting means for cocking the shutter including a cocking lever, winding means for cocking said retarding mechanism, release means connected with and operative upon unwinding of said retarding mechanism to release said shutter operating means and cocking lever, means operatively connected to said winding means adapted to impart to said driving spring of said retarding mechanism potential energy of predetermined magnitudes corresponding to different set positions of said release means and to different retarding periods, and interengaging means connecting said shutter operating means and said retarding mechanism for simultaneous cocking by said lever.

7. In a photographic camera shutter comprising a shutter and operating means therefor including a sector ring, a housing and a contact mechanism for firing flash bulbs, the combination of means including a shutter delaying mechanism having a driving spring and comprising two sections, one section including said driving spring being fixedly disposed in said housing and the other section being mounted on a bridge constituted by an arm of a two armed lever operative to disengage the coupling between said two sections, means including said sector ring operative for tripping said delaying mechanism upon initiating operation of the shutter operating means, synchronizing means adapted to synchronize the operation of said shutter operating means with the firing of different flash bulbs in a manner to permit use of the greatest shutter speeds, said synchronizing means comprising a retarding mechanism constituted by a section of said delaying mechanism, disengaging means including said two armed lever operative to disengage said other section of said delaying mechanism and to permit use of the remaining section including the driving spring as a shutter synchronizing mechanism for the flash firing operations, said disengaging means comprising a control cam provided on a ring concentric with said housing having a knurled edge and a pointer permitting manual adjustment to time marks, winding means for cocking said retarding mechanism, interengaging means connecting said shutter operating means and said retarding mechanism for simultaneous cocking by said lever, and release means connected with and operative upon unwinding of said retarding mechanism to release said sector ring, said release means including a cam disk and means operatively connected to said winding means including said cam disk adapted to impart to said driving spring of said retarding mechanism potential energy of predetermined magnitudes corresponding to different set positions of said cam disk and to different delay periods.

8. In a photographic camera shutter comprising a shutter and operating means therefor including a sector ring and a contact mechanism for firing flash bulbs, the combination of means including a shutter delaying mechanism having a driving spring, synchronizing means adapted to synchronize the operation of said shutter operating means with the firing of different flash bulbs in a manner to permit use of the greatest shutter speeds, said synchronizing means comprising a retarding mechanism constituted by a section of said delaying mechanism, disengaging means adapted to disengage a section of said delaying mechanism and to enable use of the remaining section including said driving spring as a shutter synchronizing mechanism for flash firing operations, shutter setting means for cocking the shutter including a cocking lever, winding means for cocking said retarding mechanism, interengaging means connecting said shutter operating means and said retarding mechanism winding means for simultaneous cocking by said lever, means connected with and operative upon unwinding of said retarding mechanism to release said shutter operating means and cocking lever and including a cam disk, and means operatively connected to said winding means including said cam disk adapted to impart to said driving spring of said retarding mechanism potential energy of predetermined magnitudes corresponding to different set positions of said cam disk and to different delay periods, and circuit closing means comprising two contact levers operatively connected to the sector ring, one operative to close the circuit after the opening of the shutter and the other operative to close the circuit before the opening of the shutter, a mating contact associated with said contact levers and a ring having a turned-up arm adapted to block said other contact lever.

9. In a photographic camera shutter comprising a shutter and operating means therefor including a sector ring and a contact mechanism for firing flash bulbs, the combination of means including a shutter delaying mechanism having a segment gear mounted on a shaft and a driving spring, and comprising two sections, one said section including the driving spring being fixedly disposed and the other section being mounted on a bridge constituted by an arm of a two armed lever operative to disengage the coupling between said two sections to constitute said one section a retarding mechanism, a disk disposed in the base section of said retarding mechanism having the circumference formed partially as a concentric arc section and being fixedly connected with the shaft of the segment gear of the retarding mechanism, said concentric arc section being adapted to engage and block said sector ring and upon unwinding of said retarding mechanism release the blocking of said sector ring, synchronizing means adapted to synchronize the operation of said shutter operating means with the firing of different flash bulbs in a manner to permit use of the greatest shutter speeds, comprising said retarding mechanism constituted by a section of said delaying mechanism, disengaging means including said two armed lever permitting use of said one section including the driving spring as a synchronizing mechanism comprising a control cam provided on a concentric ring, a spring around the pivot of said bridge adapted to press said bridge against said control cam thereby coupling said sections in response to adjustment of said concentric ring to a predetermined mark and uncoupling said section in response to adjustment of said concentric ring to other marks, shutter setting means for cocking the shutter, winding means for cocking said retarding mechanism, and interengaging means connecting said shutter operating means and said retarding mechanism and said shutter.

10. In a photographic camera shutter comprising a shutter and operating means therefor including a sector ring, a contact mechanism for firing flash bulbs and a shutter delaying mechanism having a driving spring and a cam disk for blocking said sector ring in cocked position, a ring having a first member adapted to disengage a section of said delaying mechanism from the section including said spring and said cam disk, the combination of means for synchronizing the operation of said shutter operating means with the firing of different flash bulbs, said synchronizing means comprising a spring driven retarding mechanism constituted by the section of said delaying mechanism including said driving spring and said cam disk, operating means for cocking said retarding mechanism, interengaging means between said shutter operating means and retarding mechanism for simultaneously cocking said shutter and said retarding mechanism, means including said cam disk connected with and adapted upon unwinding of said retarding mechanism to unblock and release said sector ring for operating the shutter, and means operative to close the flash firing circuit including two contact levers operatively connected to the sector ring, one operative to close the circuit after the opening of the shutter, the other operative to close the circuit before the opening of the shutter, a mating contact associated with said contact levers, and a second member on said ring having a conformation adapted to block the operation of said other contact lever.

References Cited in the file of this patent

UNITED STATES PATENTS

| Number | Name | Date |
|---|---|---|
| 2,081,727 | Barenyi | May 25, 1937 |
| 2,404,526 | Pirwitz | July 23, 1946 |
| 2,514,919 | Willcox | July 11, 1950 |
| 2,541,895 | Thunberg | Feb. 13, 1951 |